United States Patent
Wang et al.

(10) Patent No.: US 8,599,505 B2
(45) Date of Patent: Dec. 3, 2013

(54) OPTICAL FILTER SWITCHING APPARATUS OF SURVEILLANCE DEVICE

(75) Inventors: Shao-Hung Wang, New Taipei (TW); Feng-Yang Ma, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/495,152

(22) Filed: Jun. 13, 2012

(65) Prior Publication Data

US 2013/0148222 A1    Jun. 13, 2013

(30) Foreign Application Priority Data

Dec. 12, 2011    (TW) .............................. 100145835 A

(51) Int. Cl.
*G02B 5/22* (2006.01)
*G02B 7/00* (2006.01)

(52) U.S. Cl.
USPC ............................ 359/892; 359/889; 359/891

(58) Field of Classification Search
USPC ........................................................ 359/892
See application file for complete search history.

(56) References Cited

U.S. PATENT DOCUMENTS

| 7,973,284 B2 * | 7/2011 | Chiang | 250/330 |
| 2010/0172036 A1 * | 7/2010 | Qian | 359/814 |

* cited by examiner

*Primary Examiner* — Jade R Chwasz
(74) *Attorney, Agent, or Firm* — Altis & Wispro Law Group, Inc.

(57) ABSTRACT

An optical filter switching apparatus of a surveillance device includes a housing, a driving apparatus, a optical filter holding bracket, and at least two optical filters. The housing includes a top housing and a bottom housing. A guiding mechanism is placed in the bottom housing, and the optical filter holding bracket is engaged with the guiding mechanism. The driving apparatus is placed beside the guiding mechanism and configured for the optical filter holding bracket. The optical filters are positioned on the optical filter holding bracket. The driving apparatus controls the guiding mechanism to switch the position of the optical filters in a smooth and a steady manner.

10 Claims, 3 Drawing Sheets

OPTICAL FILTER SWITCHING APPARATUS OF SURVEILLANCE DEVICE

BACKGROUND

1. Technical Field

The disclosure is related to an optical filter switching apparatus of a surveillance device, and particularly to an optical filter switching apparatus having a guiding mechanism.

2. Description of Related Art

Surveillance cameras are widely used in financial institutions or department stores. A high-sensitivity surveillance camera capable of capturing an image at a low light level has recently been put into practical use. Surveillance cameras need to continue monitoring for twenty-four hours. Therefore, it is necessary to use surveillance cameras having a great dynamic range capable of clearly obtaining images during the day and at night. In order to prevent focus distortion, current surveillance cameras are provided with a daytime optical filter and a nighttime optical filter. The filters can be switched with one another whenever day and night change. However, current surveillance cameras are severely noisy, are complicated in construction, and have inferior endurance. Therefore, there is room for improvement in the art.

BRIEF DESCRIPTION OF THE DRAWINGS

The components in the drawings are not necessarily drawn to scale, the emphasis instead being placed upon clearly illustrating the principles of an optical filter switching apparatus of a surveillance device. Moreover, in the drawings, like reference numerals designate corresponding parts throughout the several views.

DETAILED DESCRIPTION

The disclosure will be described with references to the accompanying diagrams.

Figure 1:
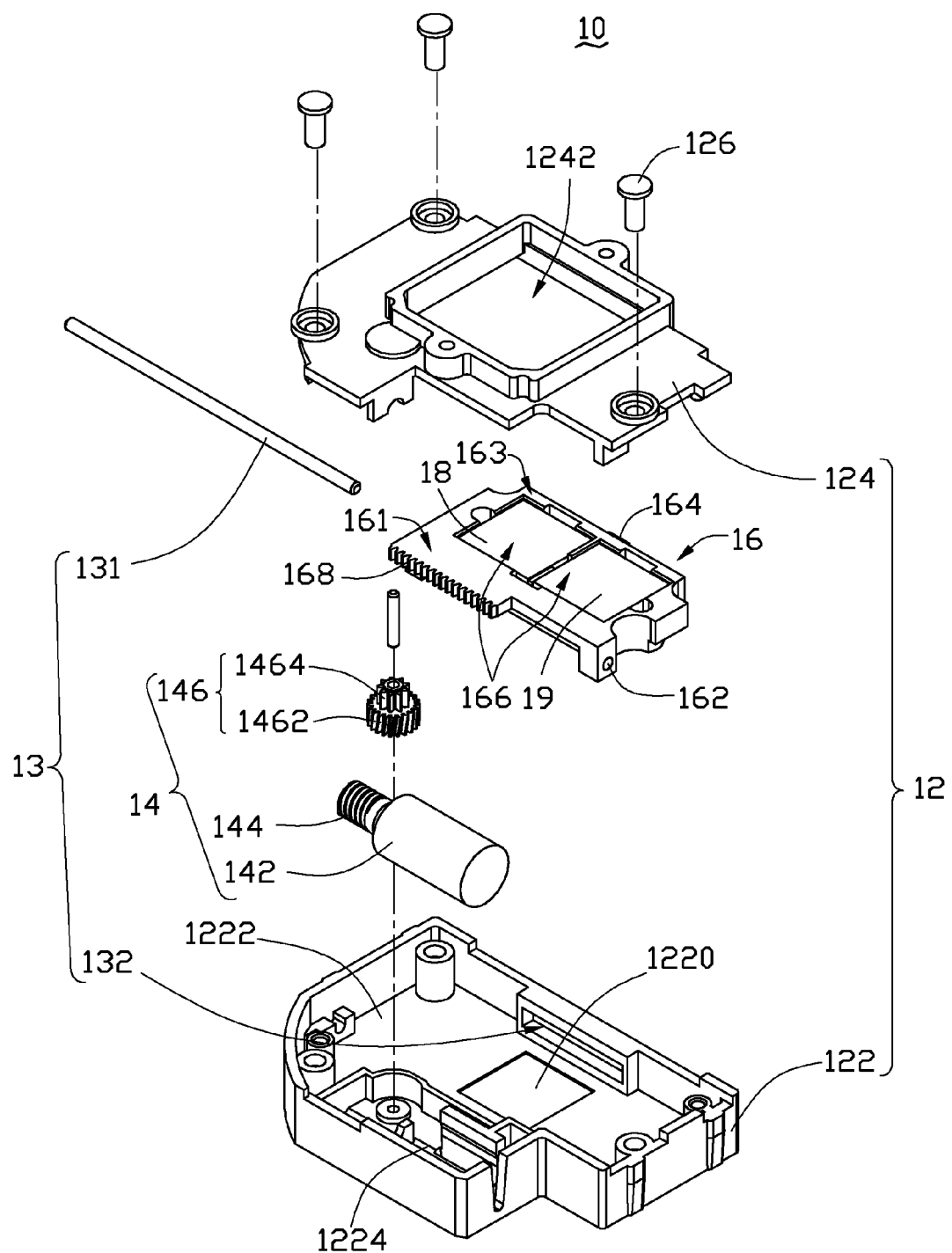
FIG. 1 is an exploded perspective view of an optical filter switching apparatus of a surveillance device of the disclosure.

FIG. 1 shows an exploded perspective view of an optical filter switching apparatus 10 of a surveillance device of the disclosure. The optical filter switching apparatus 10 has a housing 12, a driving apparatus 14, an optical filter holding bracket 16, and at least two optical filters 18, 19. The housing 12 includes a bottom housing 122 and a top housing 124. The top housing 124 is fixed to the top portion of the bottom housing 122 by screws 126. The bottom housing 122 has a first room 1222 and a second room 1224 positioned next to the first room 1222. The optical filter holding bracket 16 is placed in the first room 1222, and the driving apparatus 14 is placed in the second room 1224.

A guiding mechanism 13 includes a rod 131 and a slot 132 that are positioned in parallel. The slot 132 is embedded in a sidewall of the first room 1222. The optical filter holding bracket 16 is placed between the rod 131 and the slot 132. The optical filter holding bracket 16 has a through hole 162 embedded in a first end 161 of the optical filter holding bracket 16, and a protrusion 164 projecting from a second end 163 opposite to the first end 161. The rod 131 is inserted into the through hole 162 (see FIG. 2). The protrusion 164 is inserted into the slot 132. The movement of the optical filter holding bracket 16 is guided by the rod 132 and limited by the length of the slot 132 between the extremities of the slot 132 to slide forward and backward. The optical filter holding bracket 16 has at least two windows 166 to place the optical filters 18, 19. Each optical filter 18 or 19 is capable of filtering a specific range of wavelength to obtain sufficient light from the ambiance. The top housing 124 has a light entrance 1242 and the bottom housing 122 has a light exit 1220 located in the first room 1222 corresponding to the light entrance 1242. The ambient light enters the top housing 124 from the light entrance 1242 of a top housing 124, passes through either the optical filters 18 or 19, and leaves the bottom housing 122 from the light exit 1220 of the bottom housing 122 to project on an image capture chip (not shown). Therefore, either the optical filters 18 or 19 is positioned in the light path between the light entrance 1242 and the light exit 1220.

The driving apparatus 14 includes a motor 142, a worm drive 144 and a stepped gear 146. The worm drive 144 and the stepped gear 146 are meshed with each other and have their drive axes at 90° to each other. The stepped gear 146 is a two-step gear, including a worm gear 1462 and a spur gear 1464 stacked on the worm gear 1462. The worm drive 144 is meshed with the worm gear 1462, and the spur gear 1464 is meshed with a gear rack 168 located on a portion of the first end 161 of the optical filter holding bracket 16 close to the driving apparatus 14.

Figure 2:
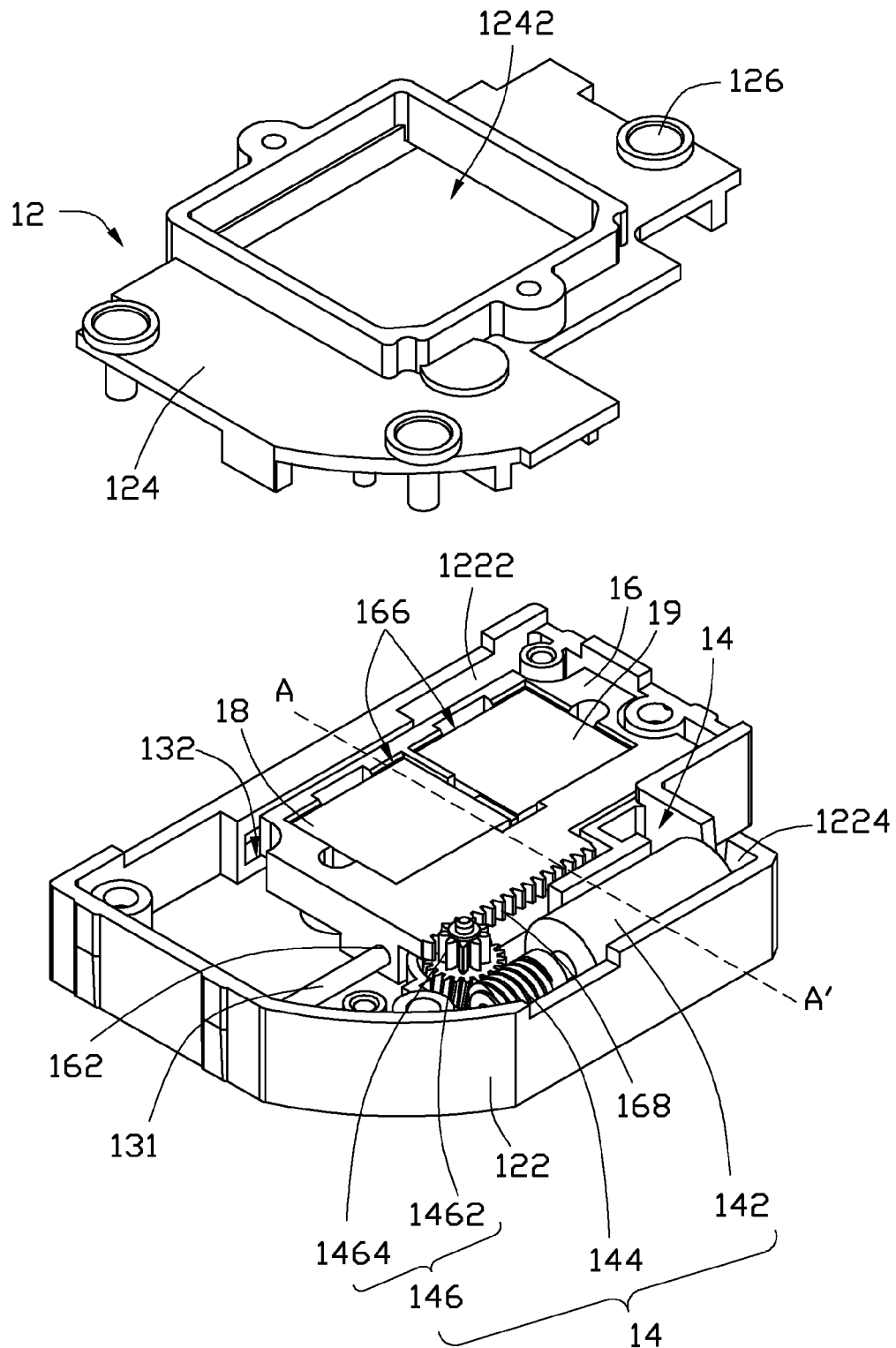
FIG. 2 is a schematic diagram illustrating the assembly of the optical filter switching apparatus of the disclosure.
Figure 3:
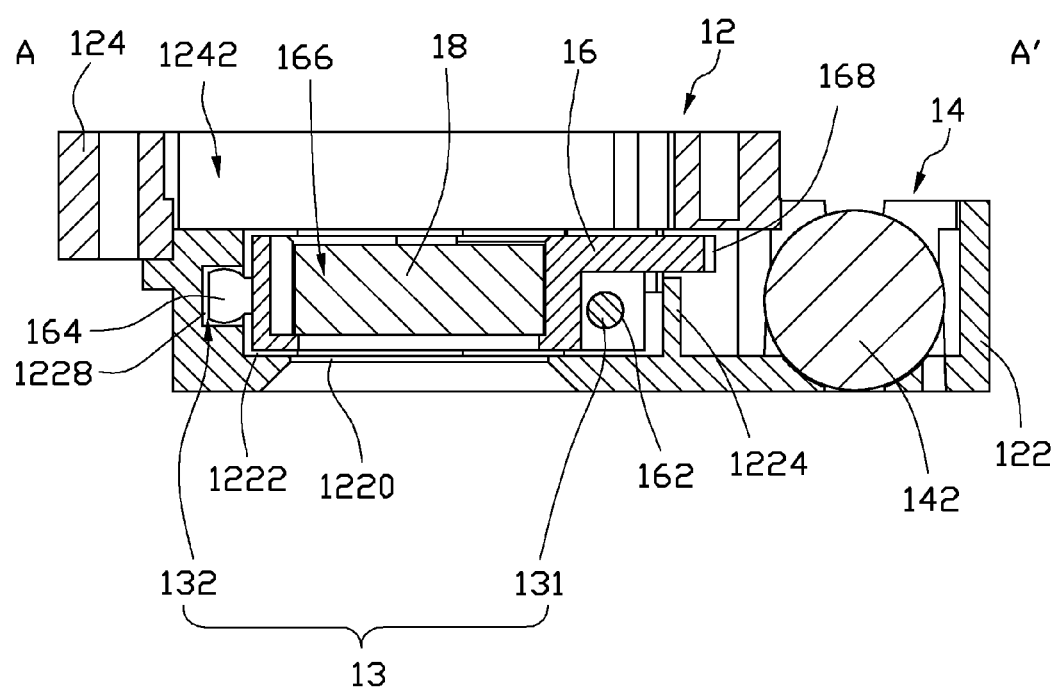
FIG. 3 is a cross-sectional view showing the optical filter switching apparatus along line A-A' in FIG. 2.

FIG. 2 shows the assembly of the optical filter switching apparatus 10 of the disclosure. When the driving apparatus 14 operates, the worm drive 144 is synchronized with the rotation of the motor 142 to push the worm gear 1462 of the stepped gear 146. The spur gear 1464 is coaxially rotating with the worm gear 1462 to drive the gear rack 168 and the optical filter holding bracket 16 to move forward and backward. Since the projection 164 is inserted in the slot 132, the movement of the optical filter holding bracket 16 is limited within the length of the slot 132 (see FIG. 3). The rod 131 inserted into the through hole 162 helps the optical filter holding bracket 16 slide on the rod 131 and change its position smoothly. The driving apparatus 14 of the disclosure uses minimum number of gears (only the stepped gear 146) and requires less space for construction. Therefore, the optical filter switching apparatus 10 of the disclosure has advantages of long lifespan, good endurance, and low cost.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. An optical filter switching apparatus of a surveillance device comprising:
   a housing, the housing comprising a bottom housing and a top housing engaged to the top housing, the bottom housing having a sidewall defining a slot;
   a guiding mechanism placed in the bottom housing, the guiding mechanism comprising a rod parallel with the slot;
   an optical filter holding bracket attached to the guiding mechanism, wherein the optical filter holding bracket comprises:
   a through hole defined a first end thereof for extension of the rod therethrough;
   a protrusion located on an opposite second end and inserted into the slot;
   a gear rack arranged on the first end;
   a driving apparatus located adjacent to the gear rack; and at least two optical filters placed on the optical filter holding bracket, wherein the rod and the slot are configured to guide movement of the optical filter holding bracket therealong, and the slot is configured to limit the movement of the optical filter holding bracket between extremities thereof.

2. The optical filter holding apparatus of claim 1, wherein the bottom housing comprises:

a first room for placing the optical filter holding bracket; and a second room positioned next to the first room;

wherein the driving apparatus is placed in the second room.

3. The optical filter holding apparatus of claim 1, wherein the optical filter holding bracket comprises at least two windows for placing the optical filters.

4. The optical filter holding apparatus of claim 3, wherein the top housing comprises a light entrance, and the bottom housing comprises a light exit positioned corresponding to the light entrance.

5. The optical filter holding apparatus of claim 4, wherein one of the windows of the optical filter holding bracket is positioned in the light path between the light entrance and the light exit.

6. The optical filter holding apparatus of claim 1, wherein the driving apparatus further comprises:

a motor;

a worm drive coaxially connected to the motor; and a stepped gear meshed with the worm drive.

7. The optical filter holding apparatus of claim 6, wherein the stepped gear is a two-step gear, and further comprises a worm gear configured for the worm drive of the driving apparatus and a spur gear stacked on the worn gear.

8. The optical filter holding apparatus of claim 7, wherein the worm is meshed with the worm gear, and the spur gear is meshed with the gear rack of the optical filter holding bracket.

9. The optical filter holding apparatus of claim 7, wherein the worm gear is a helix gear.

10. The optical filter holding apparatus of claim 1, wherein the top housing is fixed to the bottom housing by at least a screw.

\* \* \* \* \*